(12) United States Patent
Belitz

(10) Patent No.: US 11,006,638 B2
(45) Date of Patent: May 18, 2021

(54) PASTRY PREMIX COMPOSITIONS AND METHODS FOR PREPARING SAME

(71) Applicant: Aileen Shiue Belitz, McKinney, TX (US)

(72) Inventor: Aileen Shiue Belitz, McKinney, TX (US)

(*) Notice: Subject to any disclaimer, the term of this patent is extended or adjusted under 35 U.S.C. 154(b) by 0 days.

(21) Appl. No.: 16/732,904

(22) Filed: Jan. 2, 2020

(65) Prior Publication Data

US 2021/0045393 A1 Feb. 18, 2021

Related U.S. Application Data

(60) Provisional application No. 62/888,490, filed on Aug. 18, 2019.

(51) Int. Cl.
*A21D 10/00* (2006.01)

(52) U.S. Cl.
CPC .................. *A21D 10/005* (2013.01)

(58) Field of Classification Search
CPC .................................................. A21D 10/005
See application file for complete search history.

(56) References Cited

U.S. PATENT DOCUMENTS

| 2,522,591 A | 9/1950 | Wilson et al. |
| 4,891,233 A | 1/1990 | Belanger et al. |
| 9,814,250 B2 | 11/2017 | Erickson et al. |

FOREIGN PATENT DOCUMENTS

EP 1719412 A1 11/2006

OTHER PUBLICATIONS

"Re-packaging for Long-Term Storage", http://approachingready.com. Publication date: Nov. 12, 2017. pp. 1-12. (Year: 2017).*

* cited by examiner

*Primary Examiner* — Jenna A Watts
(74) *Attorney, Agent, or Firm* — SMU Law School Patent Clinic

(57) ABSTRACT

A pastry product premix preparation method includes the steps of freezing a shortening material in a condition below about 40 degrees Fahrenheit to make a solidified shortening material, breaking the solidified shortening material into particles that may have the shape of a sphere, a flake, an irregular shape, or a combination thereof; combining the shortening material with at least one dry ingredient that may include flour, salt, or baking powder to make a dry mix; vacuum-sealing the dry mix; and maintaining the dry mix at a temperature below the melting point of the shortening particles until further use.

20 Claims, 2 Drawing Sheets

PASTRY PREMIX COMPOSITIONS AND METHODS FOR PREPARING SAME

CROSS-REFERENCE TO RELATED APPLICATION

This application claims the benefit of U.S. Provisional Patent Application Ser. No. 62/888,490 filed Aug. 18, 2019, and entitled "Pastry Premix Compositions and Methods for Preparing Same", which is incorporated herein by reference in its entirety for all purposes.

TECHNICAL FIELD

The present disclosure relates to pastry premix production methods and pastry premix compositions.

BACKGROUND

Pastry products, including biscuits and pie crust products, are very popular throughout the world. These products are staples in many cultures and especially in the American context, where biscuits make a regular appearance on the breakfast and dinner tables of the American South and pies are widely consumed throughout the country on a daily basis. However, due to the time-consuming nature of creating pastry goods from scratch in commercial and home kitchens alike, premeasured mixes or ready-to-bake formulations are often used to circumvent the labor-intensive steps of measuring ingredients and incorporating shortening particles.

However, baked products formed from premeasured mixes or ready-to-bake formulations result in a final baked product of compromised texture and visual appeal as compared to forming from scratch. These formulations are also heavily processed—often containing hydrogenated fats in order to meet storage and stability requirements. In addition, transport and storage requirements of these formulations present challenging and irresponsible demands on the environment. The water content in frozen and refrigerated dough makes these products cumbersome to handle and difficult to transport, resulting in a large carbon footprint as large and heavy pallets of wholesale boxes of biscuit dough are loaded onto climate-controlled shipping trucks to send to their destination.

SUMMARY

In one implementation, the present disclosure is directed to a method including solidifying a shortening material including a water in oil emulsion; breaking the solidified shortening material into particles; combining the shortening particles with at least one dry ingredient to make a dry mix; vacuum-sealing the dry mix; and maintaining the vacuum-sealed dry mix at a temperature below the melting point of the shortening particles until further use. The shortening particles in the dry mix may contain a premeasured water content necessary to make a pastry product. In some implementations, the shortening particles have a shape such as flakes, spheres, irregular shapes, or a combination thereof. In some implementations, the shortening material may be broken by grating, grinding, rolling, cutting, shredding, or a combination of these methods. In some implementations, the dry ingredient may include flour, baking powder, salt, or any combination thereof.

In another representative implementation, the present disclosure is directed to a pastry premix preparation method including freezing a shortening material below about 40 degrees Fahrenheit to make a solidified shortening material; breaking the solidified shortening material into particles have a predetermined size range; combining flour with at least one other dry ingredient to make a mixture; mixing the shortening particles with the mixture to make a dry mix; vacuum-sealing the dry mix; and maintaining the vacuum-sealed dry mix at a temperature below the melting point of the shortening particles until further use. The maintaining step may be accomplished by freezing or refrigerating the vacuum sealed dry-mix. The shortening material may include a water in oil emulsion. In various implementations, the shortening material comprises butter, coconut oil, palm oil, lard, vegetable shortening or any combination thereof. In some implementations, the shortening particles have a shape such as flakes, spheres, irregular shapes, or a combination thereof. The shortening particles may be formed into flakes that have a predetermined size range from 1/16 inches to 3/16 inches in width, or the shortening particles may be formed into spheres that have a predetermined size range from 1 mm to 2 mm in diameter. In some implementations, the shortening material may be broken by grating, grinding, rolling, cutting, shredding, or a combination of these methods. The mixture may further include salt or baking powder, or a combination of salt and baking powder.

In still another representative implementation, the present disclosure is directed to a method for preparing a pastry product reducing the temperature of a shortening material until the shortening material has solidified; breaking the solidified shortening material into particles; mixing the shortening particles with at least one dry ingredient to make a dry mix; and vacuum-sealing the dry mix. In an implementation, the vacuum-sealed dry mix may be preserved at a temperature below the melting point of the shortening particles. In some implementations, the solidified shortening material may be broken into shortening particles including spheres, flakes, irregular shapes, or a combination thereof. The shortening particles may include flakes that have a predetermined size range from 1/16 inches to 3/16 inches in width, or the shortening particles may include spheres that have a predetermined size range from 1 mm to 2 mm in diameter. The mixture may further include salt or baking powder, or a combination of salt and baking powder. In some implementations, the dry ingredient may include flour, baking powder, salt, or any combination thereof.

In yet another implementation, the present disclosure is directed to a pastry product premix composition including particles of a solidified shortening material including a water in oil emulsion, wherein the solidified shortening particles have a predetermined shape and a predetermined size range; and at least one dry ingredient. In some implementations, the water in oil emulsion has a water content range at or below 20% by weight. In some other implementations, the dry ingredients may include salt and baking powder. In some implementations, the shortening particles have a shape such as flakes, spheres, irregular shapes, or a combination thereof. In some implementations, the shortening particles may be formed into flakes that have a predetermined size range from 1/16 inches to 3/16 inches in width, or the shortening particles may be formed into spheres that have a predetermined size range from 1 mm to 2 mm in diameter. In some implementation, the flour is selected from the group consisting of all-purpose flour, hard wheat flour, soft wheat flour, pastry flour and a combination thereof. The premix may further include salt or baking powder, or a combination of salt and baking powder. In some implementations, the vacuum-sealed dry mix may be frozen for further use.

The details of one or more implementations are set forth in the accompanying drawings and the description below. Other features, characteristic, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figures 1, 2:
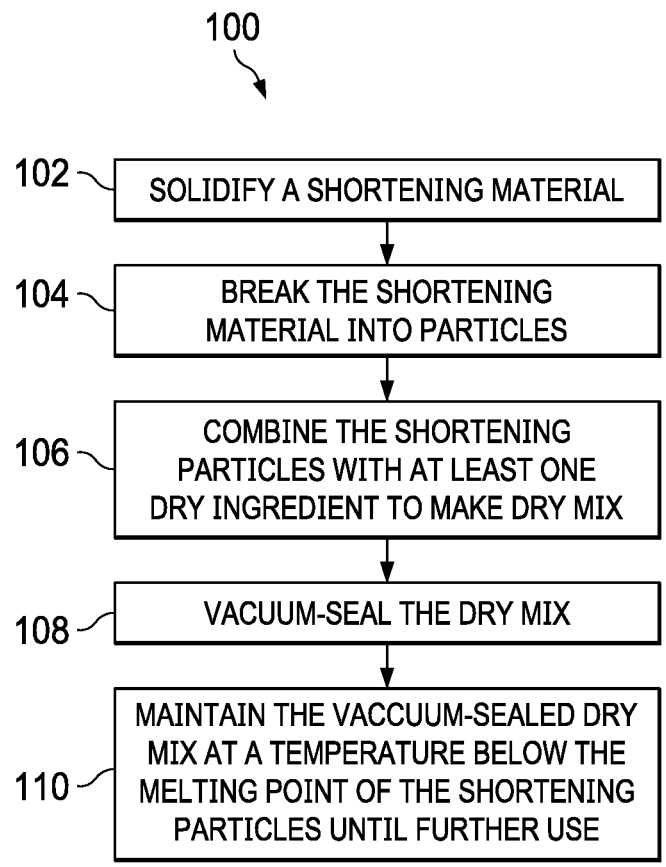
FIG. 1 illustrates a flowchart of a pastry premix preparation method according to the present disclosure.
FIG. 2 illustrates a table including representative pastry product types with representative shortening particle size ranges and representative shortening particle shapes for each such pastry product type according to the present disclosure.

Premeasured mixes or ready-to-bake formulations are often used to circumvent the labor-intensive steps of creating pastry products from scratch. These mixes and formulations include such products as ready-bake preformed frozen pie crusts, ready-bake preformed frozen biscuits, refrigerated biscuit dough cans, refrigerated pie dough, dry pie crust mix, and dry biscuit mix. It is generally acknowledged that these formulations result in a final baked product of compromised texture and visual appeal when compared to forming from scratch, primarily because none of these premeasured mixes and ready-to-bake formulations can achieve the solid fat-in-elastic dough state that results in an optimal baked pastry product. In more detail, a lower quality pastry product results because the proper interactions between fat, flour and water that result in the optimal rise of the dough system to yield a final baked product of desired characteristics are not simply achieved by addition. Instead, sequence, temperature, and states of matter in the heterogeneous dough system are the elements that encourage the process of mechanical leavening (where leavening is defined as any type of raising agent and mechanical leavening is defined as distinct from chemical or yeast-leavening in that it relies on the expansion of steam to create rise), which ultimately gives these pastry products their distinctive characteristics.

The conventional way of achieving mechanical leavening of both biscuits and pie crust pastry is through the expansion of steam produced upon melting of solid shortening substance containing both fat and water, dispersed throughout the elastic dough. In addition to mechanical leavening by steam expansion, biscuit dough systems rely upon the production of carbon dioxide gas resulting from the chemical leavening process, whereby carbon dioxide gas is produced through the acid-base reaction catalyzed through the baking powder and water chemical reaction. The expanding steam consequently forms air pockets that push outward and result in the signature characteristics unique to the pastry family of baked goods that consumers desire: crumb, texture, aeration, height, or rotundity.

Bakers in home and commercial settings have crafted many techniques to optimize mechanical leavening and promote a dough system of solid shortening in elastic dough. Traditional methods include chilling the ingredients prior to cutting the solid shortening; chilling the work surface; using work surfaces of higher thermal mass, such as, for example, marble to absorb heat from the dough; preparing the dough in a designated pastry room of chilled room air; using ice water to hydrate the mixture; or handling the dough as little as possible to minimize the transference of body heat from the hands to the product. Regardless of which method is chosen, the goal is to reach a final dough system of solid shortening particles dispersed within an elastic dough matrix that leverages the maximum output of mechanical leavening. Unfortunately, all of these techniques are time-consuming and inconvenient.

The present disclosure is directed to pastry premix production methods and pastry premix compositions. The pastry premix production methods form pastry premix compositions having substantially uniformly distributed shortening particles throughout. As such, mechanical leavening occurs without further effort, allowing users to effortlessly and efficiently prepare pastry products in a home or commercial kitchen that have desirable taste and texture characteristics.

Figure 3:
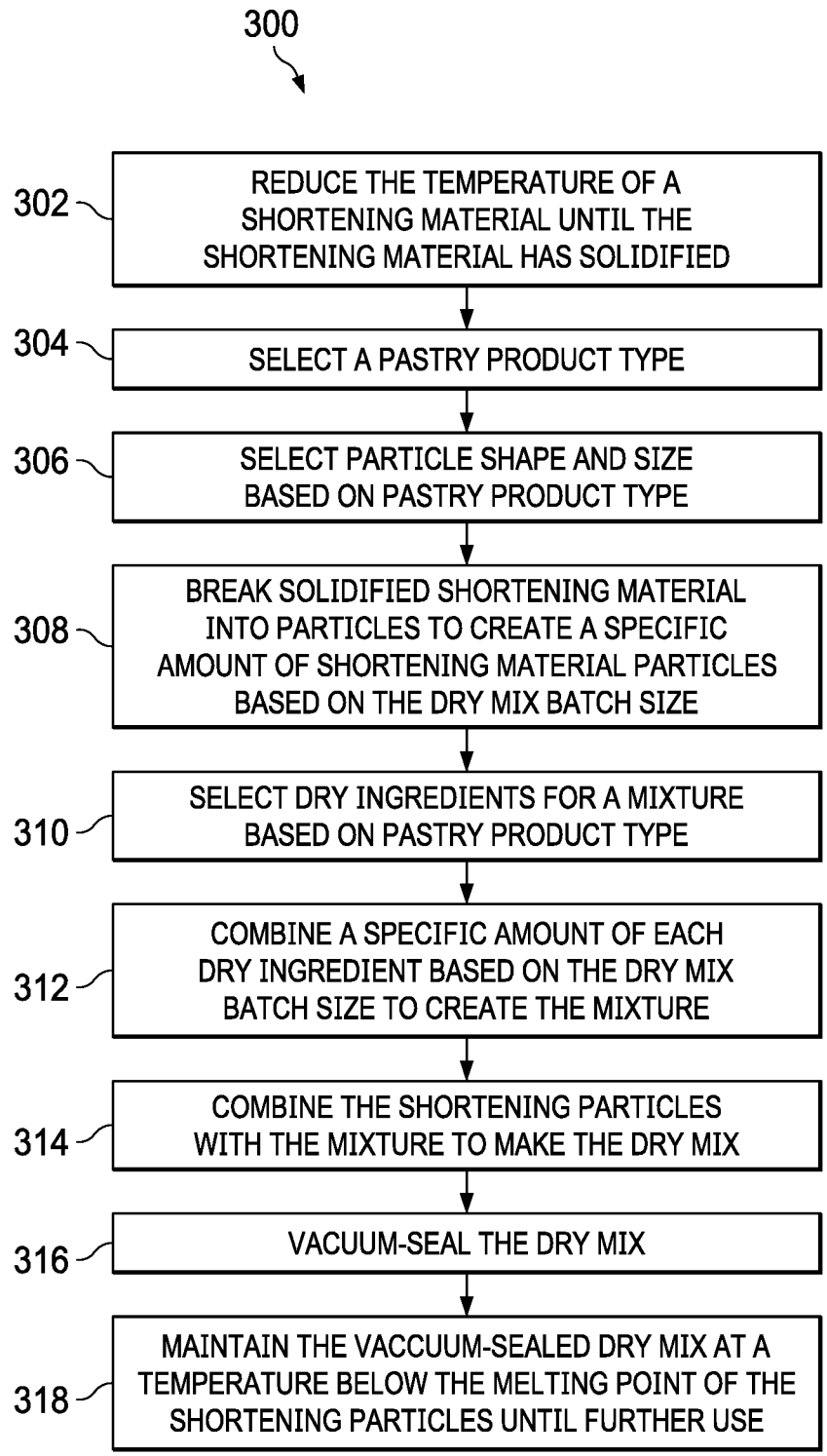
FIG. 3 illustrates a detailed flowchart of another implementation of a pastry premix preparation method according to the present disclosure.

FIG. 1 and FIG. 3 depict various implementations of pastry premix preparation methods according to the present disclosure. FIG. 2 illustrates a table of representative pastry product types with representative shortening particle size ranges and representative shortening particle shapes for each such pastry product type. As used in the present disclosure, the term "shortening" means any fat used to make pastry or other food products. For example, shortening may include butter, coconut oil, palm oil, lard, vegetable shortening, or any other fat used to make food products.

FIG. 1 illustrates a flowchart of a method 100 for preparing a dry mix according to the present disclosure. Step 102 comprises solidifying a shortening material by reducing its temperature. In some implementations, the shortening material may be solidified by freezing the shortening material. In some implementations, the shortening material may contain a water in oil emulsion. The water contained within the shortening material may be the only water required to make the final pastry product from the dry mix. In Step 104, the solidified shortening material is then broken into particles that may include, for example, flakes, spheres, or irregular shapes having a predetermined size range to achieve optimal texture and desired characteristics. Any suitable method may be used for breaking the shortening material into particles, such as, for example, grating, grinding, rolling, cutting, shredding, or a combination of these methods. In Step 106, the shortening particles are then combined with at least one dry ingredient to make a dry mix with shortening particles that are substantially evenly distributed throughout. Any appropriate dry ingredient may be used in the combining step, for instance, flour, baking powder, salt or any combination of suitable dry ingredients. In Step 108, the dry mix is vacuum-sealed to maintain the substantial even distribution of shortening particles throughout the dry mix as the dry mix is transported. In Step 110, the vacuum-sealed dry mix is maintained in a condition below the melting point of the shortening particles until further use. In some implementations, the shortening may be stored at a temperature which allows the solidified shortening particles to soften but above a temperature which would liquefy the shortening particles. In some implementations, the shortening may be stored frozen in a condition below about 40 degrees Fahrenheit. In one implementation, when a user is ready to make a pastry product, the vacuum-sealed dry mix is further combined with wet ingredients, such as, for example, eggs and milk to make a slurry. In some implementations, water is not a wet ingredient used to make the slurry. Such slurry can be used to make the desired pastry products. Because the shortening particles are uniformly distributed throughout the dry mix, when the slurry is made, mechanical leavening will be achieved without further effort, whereas a much more arduous process is usually required to achieve mechanical leavening when making pastry products in a commercial or home kitchen.

FIG. 2 illustrates a Table 200 for representative shortening particle sizes 220 and shapes 230 for preparing dry mixes that correspond to representative pastry product types 210, according to the present disclosure. The shapes and the sizes of the shortening particles contribute to the texture and other characteristics of the pastry products because they result in a correlating air pocket size upon melting. Shortening particles in the shape of flakes may produce final baked products having flat pastry flakes, as seen in traditional pie crusts and the like, whereas shortening particles in smaller spherical/granular shapes may produce final baked pastry products having denser crumb characteristics, such as shortbread tart crusts, i.e., pâte sucrêe, and the like. It is the size and shape of the shortening particles, whether they are formed as flakes or spheres or another shape, that ultimately determines what bakers refer to as the "crumb," which can also be thought of as the internal pattern or structure of a baked good that results in the distinctive "mouth-feel" or texture of the product.

In one implementation, for example, a dry mix for a Biscuit 212 may be prepared with shortening particles formed as flakes 232 that have a width range 222 of 1/16 inches to 3/16 inches and come in varying lengths. In another implementation, a dry mix for a Flaky Pie Crust 214 may be prepared with shortening particles formed as flakes 234 that have a width range 224 of 1/16 inches to 3/16 inches and come in varying lengths. In yet another implementation, a dry mix for a Shortbread Pie Crust 216 may be prepared with shortening particles formed as spheres 236 that have a diameter range 226 of 1 mm to 2 mm.

FIG. 3 illustrates a flowchart of one representative implementation of a method 300 for preparing a dry mix in accordance with the present disclosure. In Step 302, the temperature of a shortening material is reduced until the shortening material has solidified. In an implementation, the solidifying step is accomplished by storing the shortening material in a condition below about 40 degrees Fahrenheit until the shortening material is solidified. In Step 304, a pastry product type is selected. In Step 306, a shortening material particle shape and size is predetermined based on the selected pastry product type and desired texture. In one implementation, reference may be made to the Table 200 of FIG. 2 to determine the appropriate shortening material particle shape and size for a selected pastry product type. In Step 308, the solidified shortening material is then broken into particles having the predetermined shape and size range, and a specific amount or volume of shortening particles are created based on the desired dry mix batch size. In various implementations, the breaking method may be chosen from grating, grinding, rolling, cutting, shredding, or any combination of these methods, which will depend upon the desired shortening material particle shape. In Step 310, dry ingredients are selected for a mixture based on the pastry product type and desired texture. For example, flour, salt, baking powder or any combination of those ingredients may be chosen for the mixture. In Step 312, specific amounts or volumes of each dry ingredient based on the dry mix batch size are combined to create a mixture. In Step 314, the shortening particles are combined with the mixture of dry ingredients to make a dry mix with shortening particles that are substantially evenly distributed throughout. In Step 316, the dry mix is vacuum-sealed to ensure that the shortening particles remain substantially evenly distributed throughout the dry mix under any condition. In Step 318, the vacuum-sealed dry mix is then maintained or stored under conditions below the melting point of the shortening particles until further use. For example, the shortening particles may be stored at room temperature, refrigerated, or frozen under conditions at or below 40 degrees Fahrenheit. In some implementations, the storage temperature of the shortening particles may allow the shortening particles to soften.

All of the foregoing methods produce a composition, which includes particles of a solid or softened shortening material and at least one dry ingredient. In one implementation, the shortening material includes a water in oil emulsion, which includes water content at or below 20%. In one implementation, the solidified shortening particles may be formed into shapes that include, for example, flakes, spheres, or irregular shapes. In one implementation, the shortening particles may be made into flakes having a predetermined width ranging from 1/16 inches to 3/16 inches and varying lengths to achieve optimal texture. In another implementation, the shortening particles may be made into spheres having a predetermined diameter from 1 mm to 2 mm for desired characteristics. In some implementations, the shortening particles are made using techniques including grating, grinding, rolling, cutting, or shredding. In one implementation, the dry ingredients may include all-purpose flour, hard wheat flour, soft wheat flour, pastry flour or a combination of these flours. In one implementation, the other dry ingredients may include, for instance, baking powder, salt or any combination of suitable dry ingredients.

It is to be understood that the implementations of methods and compositions described herein may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular implementations of the methods and compositions described in the specification. As one of ordinary skill in the art will readily appreciate from the disclosure, methods, method steps, compositions, or composition components presently existing or later to be developed that perform substantially the same function or achieve substantially the same result as the corresponding implementations described herein may be utilized according to the present disclosure. Accordingly, the appended claims are intended to include within their scope such methods, steps, compositions, and/or components.

EXAMPLES

Example 1—Pie crust: 298 g of flour and 1 tablespoon of salt were mixed to create a mixture of dry ingredients. 227 g of frozen butter particles were prepared through grating frozen butter into shreds ranging from 1/16 inch to 3/16 inch in width and having varying lengths. The frozen butter shreds were then mixed with the mixture of dry ingredients until the frozen butter shreds were substantially evenly distributed, thereby forming a dry mix. The dry mix was then transferred into a bag and sealed under vacuum into a brick-like block, which served to preserve the distribution of frozen butter shreds in situ. The vacuum-sealed dry mix was then stored in a refrigerator until further use. When ready to prepare a pie crust, the dry mix was first taken out of the vacuum-sealed bag and combined with 57-133 g of water to form a slurry. The slurry was then stirred until a workable coherent mass of dough was achieved. The dough was then fitted into a baking dish and baked until golden brown to get a baked pie crust.

| Ingredients | Formulation |
| --- | --- |
| All-Purpose flour | 298 g |
| Salt | 1 tsp |
| Frozen butter particles | 227 g (formed as 1/16-3/16 inch width shreds of varying length) |

Example 2—Shortbread pie crust: 298 g of flour and 2 tablespoons of sugar were mixed to create a mixture of dry ingredients. 227 g of frozen butter particles were prepared through grinding frozen butter into spheres with diameters ranging from 1 mm to 2 mm. The frozen butter spheres were then mixed with the dry ingredients until the frozen butter spheres were substantially evenly distributed, thereby forming a dry mix. The dry mix was then transferred into a bag and sealed under vacuum into a brick-like block, which served to preserve the distribution of frozen butter spheres in situ. The vacuum-sealed dry mix was then stored in a refrigerator until further use. When ready to prepare a shortbread pie crust, the dry mix was first taken out of the vacuum-sealed bag to thaw and allow for adherence of the flour and sugar to the butter. The dry mix was then pressed into a tart pan and baked until golden brown to get a baked shortbread pie crust.

| Ingredients | Formulation |
| --- | --- |
| All-Purpose flour | 298 g |
| Sugar | 1 tsp |
| Frozen butter particles | 227 g (formed as 1-2 mm spheres) |

Example 3—Biscuit: 361 g of flour, 1 tablespoon of salt, and 14 g of baking powder were mixed to create a mixture of dry ingredients. 85 g of frozen butter particles were then prepared through grating butter into flakes ranging from 1/16 inch to 3/16 inch in width and having various lengths. The frozen butter flakes were then mixed with the mixture of dry ingredients until the frozen butter flakes were substantially evenly distributed, thereby forming a dry mix. The dry mix was then transferred into a bag and sealed under vacuum into a brick-like block, which served to preserve the distribution of frozen butter flakes in situ. The vacuum-sealed dry mix was then stored in a freezer until further use. When ready to prepare biscuits, the dry mix was first taken out of the bag and combined with 227-255 g of cold milk or buttermilk to form a slurry. The slurry was then lightly stirred until a dough of desired consistency was achieved. The dough was then gently folded over in a minimal knead to form coherent mass. The dough was then rolled until 1-1.5" thickness was achieved, and cut into individual biscuits using a round biscuit cutter. The individual biscuits were placed on a baking sheet and then baked until golden and fluffy to get baked biscuits.

| Ingredients | Formulation |
| --- | --- |
| All-Purpose flour | 361 g |
| Sugar | 1 tsp |
| Frozen butter particles | 85 g (formed as 1/16-3/16 inch width grated flakes of varying length) |
| Baking powder | 14 g |

The invention claimed is:

1. A method for preparing a pastry product, comprising:
freezing a shortening material to below about 40 degrees Fahrenheit to make a solidified shortening material;
breaking the solidified shortening material into particles with a predetermined size range;
combining flour with at least one other dry ingredient to make a mixture;
mixing the shortening particles with said mixture to make a dry mix while the shortening particles are solidified, wherein the dry mix includes no added liquid except the liquid in the shortening particles, and wherein the dry mix has a substantially even distribution of the shortening particles throughout the dry mix;
vacuum-sealing the dry mix to maintain the substantially even distribution of the shortening particles throughout the dry mix, wherein the shortening particles in the dry mix are solidified; and
maintaining the vacuum-sealed dry mix at a temperature below the melting point of the shortening particles until further use.

2. The method according to claim 1, wherein the shortening material comprises a water in oil emulsion.

3. The method according to claim 1, wherein the shortening material comprises butter, coconut oil, palm oil, lard, vegetable shortening, or any combination thereof.

4. The method according to claim 1, wherein said shortening particles have a shape selected from the group consisting of: flakes, spheres, irregular shapes or a combination thereof.

5. The method according to claim 4, wherein said shortening particles comprise flakes having a predetermined size range from 1/16 inches to 3/16 inches in width.

6. The method according to claim 4, wherein said shortening particles comprise spheres having a predetermined size range from 1 mm to 2 mm in diameter.

7. The method according to claim 1, wherein said breaking step is accomplished by at least one of the following methods: grating, grinding, rolling, cutting, and shredding.

8. The method according to claim 1, wherein the at least one other dry ingredient comprises: baking powder, salt, or any combination thereof.

9. The method according to claim 1, wherein the maintaining step comprises freezing or refrigerating the vacuum sealed dry-mix.

10. A method, comprising:
reducing the temperature of a shortening material comprising a water in oil emulsion to form a solidified shortening material;
breaking the solidified shortening material into particles;
combining the shortening particles with at least one dry ingredient to make a dry mix while the shortening particles are solidified, wherein the dry mix includes no added liquid except the liquid in the shortening particles, and wherein the dry mix has a substantially even distribution of the shortening particles throughout the dry mix;

vacuum-sealing the dry mix to maintain the substantially even distribution of the shortening particles throughout the dry mix, wherein the shortening particles in the dry mix are solidified; and maintaining the vacuum-sealed dry mix at a temperature below the melting point of the shortening particles until further use.

11. The method according to claim 10, wherein the shortening particles in the dry mix contain a premeasured water content necessary to make a pastry product.

12. The method according to claim 10, wherein said shortening particles have a shape selected from the group consisting of: flakes, spheres, irregular shapes or a combination thereof.

13. The method according to claim 10, wherein said breaking step is accomplished by at least one of the following methods: grating, grinding, rolling, cutting, and shredding.

14. The method according to claim 10, wherein the at least one dry ingredient comprises flour, baking powder, salt, or any combination thereof.

15. A method for preparing a pastry product, comprising:
reducing the temperature of a shortening material until the shortening material has solidified;
breaking the solidified shortening material into particles;
mixing the shortening particles with at least one dry ingredient to make a dry mix while the shortening particles are solidified, wherein the dry mix includes no added liquid except the liquid in the shortening particles, and wherein the dry mix has a substantially even distribution of the shortening particles throughout the dry mix; and
vacuum-sealing the dry mix to maintain the substantially even distribution of the shortening particles throughout the dry mix, wherein the shortening particles in the dry mix are solidified.

16. The method according to claim 15, wherein the vacuum-sealed dry mix is preserved at a temperature below the melting point of the shortening particles.

17. The method according to claim 15, wherein the solidified shortening material is broken into shortening particles comprising spheres, flakes, irregular shapes, or some combination thereof.

18. The method according to claim 17, where the shortening particles comprise flakes having a predetermined size range of 1/16 inches to 3/16 inches in width.

19. The method according to claim 17, wherein the shortening particles comprise spheres having a predetermined size range from 1 mm to 2 mm in diameter.

20. The method according to claim 15, wherein the at least one dry ingredient comprises flour, baking powder, salt, or any combination thereof.

* * * * *